United States Patent
Bellaouar et al.

(10) Patent No.: US 7,376,400 B2
(45) Date of Patent: May 20, 2008

(54) SYSTEM AND METHOD FOR DIGITAL RADIO RECEIVER

(75) Inventors: Abdellatif Bellaouar, Richardson, TX (US); Paul-Aymeric Fontaine, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 329 days.

(21) Appl. No.: 10/915,296

(22) Filed: Aug. 10, 2004

(65) Prior Publication Data

US 2005/0070325 A1    Mar. 31, 2005

Related U.S. Application Data

(60) Provisional application No. 60/505,898, filed on Sep. 25, 2003, provisional application No. 60/505,892, filed on Sep. 25, 2003.

(51) Int. Cl.
*H04B 1/26* (2006.01)
*H04B 1/28* (2006.01)

(52) U.S. Cl. ............... 455/130; 455/197.2; 455/232.1; 455/324; 455/333; 455/340

(58) Field of Classification Search ............. 455/197.2, 455/232.1–253.2, 293, 323–325, 333, 334, 455/340, 341; 330/9, 51, 133
See application file for complete search history.

(56) References Cited

U.S. PATENT DOCUMENTS

| | | | | |
|---|---|---|---|---|
| 5,153,593 A | * | 10/1992 | Walden et al. | 341/143 |
| 5,212,826 A | * | 5/1993 | Rabe et al. | 455/214 |
| 5,847,600 A | * | 12/1998 | Brooks et al. | 330/9 |
| 6,516,185 B1 | * | 2/2003 | MacNally | 455/234.1 |
| 6,914,437 B2 | * | 7/2005 | Ibrahim et al. | 324/616 |
| 7,110,732 B2 | * | 9/2006 | Mostafa et al. | 455/130 |
| 7,158,774 B2 | * | 1/2007 | Helio et al. | 455/340 |
| 2004/0077326 A1 | * | 4/2004 | Shi | 455/313 |
| 2004/0106380 A1 | * | 6/2004 | Vassiliou et al. | 455/73 |
| 2005/0059364 A1 | * | 3/2005 | Hansen et al. | 455/127.4 |
| 2006/0003726 A1 | * | 1/2006 | Razzell | 455/323 |
| 2007/0117507 A1 | * | 5/2007 | Wakayama et al. | 455/3.02 |

OTHER PUBLICATIONS

Akhi, Faridun, "Design And Implementation Of A Software Radio Testset For Research And Laboratory Instruction," Auburn University, Oct. 30, 2003, 119 pgs., Auburn, Alabama.
Brannon, Brad, "Basics Of Designing A Digital Radio Receiver (Radio 101)," Analog Devices, Inc., Greensboro, North Carolina, 9 pgs.

(Continued)

*Primary Examiner*—Simon Nguyen
(74) *Attorney, Agent, or Firm*—Ronald O. Neerings; Wade J. Brady, III; Frederick J. Telecky, Jr.

(57) ABSTRACT

A communications system comprising a processor, a variable oscillator, a radio frequency (RF) quadrature demodulator, a variable capacitor, a continuous-time, sigma-delta analog-to-digital converter (ADC), and a frequency divider, all integrated on a single semiconductor chip. The ADC samples the RF quadrature demodulator output. The processor sets the communications system frequency by controlling the oscillator, the frequency divider and the variable capacitor.

22 Claims, 4 Drawing Sheets

OTHER PUBLICATIONS

Hogenauer, Eugene B., "An Economical Class Of Digital Filters For Decimation And Interpolation," IEEE Transactions On Acoustics, Speech, And Signal Processing, vol. ASSP-29, No. 2, Apr. 1981, pp. 155-162.

Kosmerchock, Steven L., "Digital Automatic Gain Control," 3 pgs., http://www.geocites.com/ResearchTriangle/Lab/6584/agc_home.html.

Liang, Yunfeng and Lian, Yong, "A 250MHz CMOS Bandpass Delta Sigma Modulator Using Continuous-Time Resonator Structure(Short Paper)," Department Of Electrical And Computer Engineering, National University Of Singapore, Singapore, 4 pgs.

Meacham, Dan and Soumyanath, Krishnamurthy, "Standard CMOS Ultrawideband Single-Chip Solutions," 4 pgs., http://www.us.design-reuse.com/articles/article7848.html http://www.eet.com/article/showArticle.jhtml?articleID=20300705.

O'Grady, Albert, "Harness The Power Of Sigma-Delta And Switched-Capacitor Technologies In Signal Processing Components," Analog Devices, Limerick, Ireland, 8 pgs., http://www.sensorsmag.com/articles/1198/har1198/main.shtml.

Park, Sangil, "Motorola Digital Signal Processors: Principles Of Sigma-Delta Modulation For Analog-To-Digital Converters," 64 pgs.

Thompson, Jim, "Care And Feeding Of The One Bit Digital To Analog Converter," University Of Washington, Jun. 8, 1995, 7 pgs., http://www.ee.washington.edu/conselec/CE/kuhn/onebit/primer.htm.

Zou, Min et al., "Quad Demodulators Arm Direct-Conversion Receivers," Microwaves & RF, 2004, 6 pgs., http://www.mwrf.com/Articles/Print.cfm?ArticleID=7470.

* cited by examiner

HVG = HIGH VOLTAGE GATE

SYSTEM AND METHOD FOR DIGITAL RADIO RECEIVER

CROSS-REFERENCE TO RELATED APPLICATIONS

This application is a non-provisional application claiming priority to provisional application Ser. No. 60/505,892 filed on Sep. 25, 2003. This application also claims priority to provisional application Ser. No. 60/505,898 filed on Sep. 25, 2003. Both provisional applications are hereby incorporated by reference.

BACKGROUND

Wireless communication devices have become ubiquitous in today's society. Such devices employ a wide variety of integrated circuits (ICs) to support a wide variety of wireless communication standards. These wireless communications standards include Global Systems for Mobile Communication (GSM), Wideband Code Division Multiple Access (WCDMA), and Code Division Multiple Access 2000 (CDMA2K) to name a few. The wireless device may be configured to support the various wireless communication standards.

Wireless communication devices have traditionally implemented separate analog circuitry for each wireless communication standard that was supported by the wireless device. For instance, one analog receive path would be dedicated to GSM, a separate analog receive path would be dedicated to WCDMA, another analog receive path would be dedicated to CDMA2K, and yet other analog receive paths would be dedicated to other wireless communication standards. Supporting multiple communication standards in this manner often requires duplicate circuitry for each channel, where each copy of the circuitry is tuned to support different frequency ranges. Such an approach is undesirable for several reasons, especially in the context of portable wireless devices such as cell phones. First, the duplicate circuitry consumes additional battery power, which is a primary concern in portable wireless devices. Second, the duplicate circuitry utilizes additional space within the often-confined space of the portable wireless device. Lastly, once analog circuitry has been configured to support a particular wireless communication standard, the analog circuitry is difficult to reconfigure to support a different communication standard.

Modern integrated circuits (ICs) integrate DSP functionality and analog functionality on the same IC, thereby allowing multiple communication standards to be supported by a single IC. FIG. 1 depicts a direct conversion receiver 10 capable of supporting multiple communication standards. Radio frequency (RF) signals are received by antenna 12 and amplified by a low noise amplifier (LNA) 14. The output of the LNA 14 is provided to an in-phase mixer 16 and to a quadrature mixer 18. A local oscillator (LO) provides a signal to a quadrature signal generator 20. Quadrature signal generator 20 provides the LO signal to mixer 16 and a quadrature version of the LO signal to mixer 18. In this manner, the RF signals may be directly "down-converted" or brought down to the lower frequency baseband signal range without first down converting to an intermediate frequency (IF).

The magnitude of the signal received from antenna 12 varies based upon the distance between system 10 and the transmitter; this variation is sometimes referred to as "dynamic range". In the case of a cellular base station, if a cell phone is close to the base station then the signal strength is large whereas if the cell phone is far away from the base station then the signal strength is weak. In practice, the dynamic range may be on the order of 100 dB or a ratio of 100,000:1.

In order to accommodate such a large dynamic range, variable gain amplifiers (VGAs) 22-25 amplify or attenuate mixed signals from mixers 16 and 18. As well as amplifying desired signals, amplifiers 22-24 also amplify undesired signals. Low pass filters (LPFs) 26 and 28 block undesired signal frequencies. Analog to digital converters (ADCs) 30 and 32 convert the analog baseband signal into a digital signal for further signal processing by digital filters 34 and 36 and digital baseband processor 37. Processor 37 may decode the digital signal according to one of the many supported wireless communications standards.

ADCs 30 and 32 have a range of analog values (both in terms of frequency and magnitude) that they are capable of converting to a digital value. Analog values that are above the upper limit of the magnitude range may saturate the ADC. The VGAs 22-25 strive (under the control of the processor 37) to keep the input to ADCs 30 and 32 within a desired range of analog values that ADCs 30 and 32 are capable of converting to digital values without saturation. ADCs 30 and 32 are driven by a sample clock of frequency $F_s$. If the sample clock frequency $F_s$ is not more than twice the maximum frequency of the sampled signal (a limit known as the Nyquist frequency), then ADCs 30 and 32 will undesirably generate aliased versions of the converted signals. Accordingly, the LPF 26 and 28 may be designed to limit the signal spectrum to less than half the Nyquist frequency. Alternatively, anti-alias filters may be implemented before ADCs 30 and 32 to limit the frequency range of the sampled analog signal to less than half the Nyquist frequency, thus minimizing the interference introduced by the aliased signals on the desired signal.

Although receiver 10 overcomes some of the disadvantages of the analog signal processing systems mentioned above, it too has drawbacks. First, although processor 37 dynamically adjusts to the various communications standards, dynamically configuring the analog blocks, such as LPFs 26 and 28 and the anti-alias filters, is difficult due to the different filtering and noise requirements of each communication standard. Second, LPFs 26 and 28 as well as the anti-alias filters are integrated on the same die as the other components of system 10, and since LPFs 26 and 28 and the anti-alias filters accommodate multiple communication standards, they may consume a large proportion of the total die size. Indeed, it is not uncommon for a die with a total area of 3 to 4 mm$^2$ to contain a programmable filter that consumes 2 mm$^2$. Third, matching the analog circuitry along the in-phase and quadrature paths can be difficult, particularly when this analog circuitry supports multiple communications standards. Accordingly, a receiver architecture capable of implementing multiple communications standards more efficiently is desirable.

SUMMARY

The problems noted above are addressed in large part by a system and method for a single-chip, processor-controlled, digital, radio frequency (RF) receiver with continuous-time, sigma-delta analog-to-digital converters (ADC). One illustrative embodiment is a communications system comprising: a processor, a variable oscillator, an RF quadrature demodulator, a variable capacitor, a continuous-time analog-to-digital converter, and a frequency divider. The processor, the variable oscillator, the frequency divider, the RF quadrature demodulator, the variable capacitor, and the ADC are integrated on a single, semiconductor chip. The variable capacitor couples to the output of the RF quadrature demodulator. The ADC samples the output of the RF quadrature demodulator. The processor sets the frequency of the communications system by controlling the oscillator, the frequency divider and the variable capacitor.

Another illustrative embodiment is a communications system comprising an ADC and a processor. The ADC input circuitry comprises a plurality of transconductance amplifiers coupled in parallel with one another. Control of the communications system gain comprises adjusting the gain of the ADC by selectively enabling one or more of the plurality of transconductance amplifiers. The processor and the ADC are integrated on a single, semiconductor chip. The processor monitors a magnitude of a received signal and controls the communications system gain in response to the magnitude of the received signal.

Yet another illustrative embodiment is a communications system comprising: a processor, an RF quadrature demodulator, and a variable capacitor. The processor, RF quadrature demodulator, and the variable capacitor are integrated on a single, semiconductor chip. The variable capacitor couples to the output of the RF quadrature demodulator. The variable capacitor and the output circuitry of the RF quadrature demodulator form a tunable, low-pass filter. The digital data processor sets the pole frequency of the tunable, low-pass filter.

Yet another illustrative embodiment is a method comprising: demodulating the in-phase (I) and quadrature (Q) baseband signals, digitizing the I and Q baseband signals, averaging digitized I and Q data, reducing a sampling frequency of the digitized I and Q data to the Nyquist frequency of the I and Q baseband signals, eliminating DC-offsets in the digitized I and Q data, estimating a combined, weighted magnitude of the digitized I and Q data, averaging and integrating the combined, weighted magnitude of the digitized I and Q data, generating one or more gain control signals based on an averaged and integrated value of the combined, weighted magnitude of the digitized I and Q data, controlling gain of a plurality of amplification stages within the single-chip, digital RF receiver, and stepping the gain of each of the plurality of amplification stages by predetermined discrete values. The gain of each of the plurality of amplification stages is stepped in response to the combined, weighted magnitude of the digitized I and Q data so as to strive to maintain the output of the single-chip digital RF receiver within a predetermined range of magnitudes.

Yet another illustrative embodiment is a communications system comprising a power supply, a first metal oxide semiconductor (MOS) device, a load resistor, a second MOS device, and a constant current source. The current source provides a bleed current sufficient to operate the first MOS device linearly for a given value of the load resistor.

Notation and Nomenclature

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices and connections. Further, the term "direct conversion" receiver is intended to include zero-IF and low-IF receivers. As such, a direct conversion receiver may convert an RF signal to baseband or "near" baseband.

BRIEF DESCRIPTION OF THE DRAWINGS

For a more detailed description, reference will now be made to the accompanying drawings, wherein like components are indicated using like reference numbers.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, or the claims, unless otherwise specified.

Figure 1:
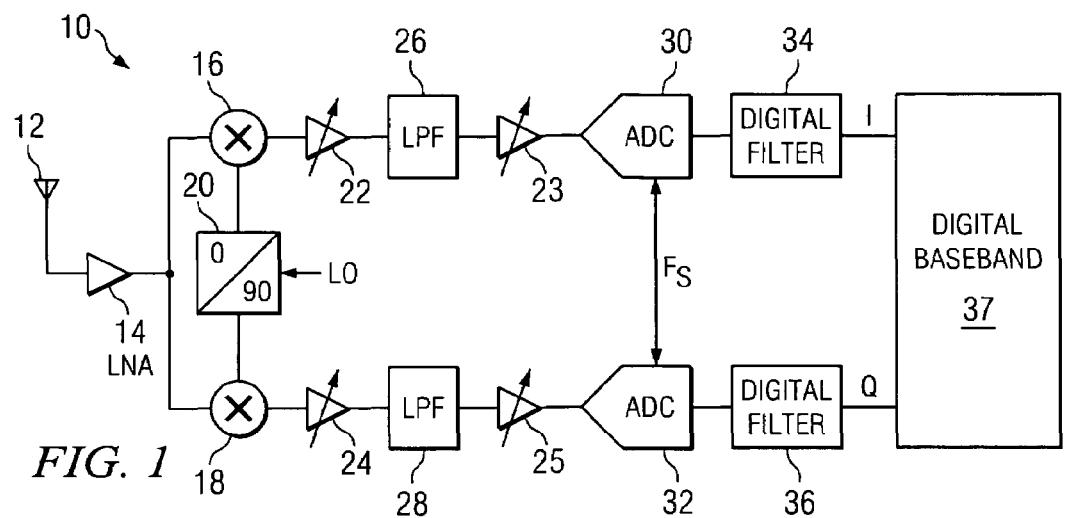
FIG. 1 depicts a receiver.

FIG. 1 depicts a direct conversion receiver 10 capable of supporting multiple communication standards. Radio frequency (RF) signals are received by antenna 12 and amplified by a low noise amplifier (LNA) 14. The output of the LNA 14 is provided to an in-phase mixer 16 and to a quadrature mixer 18. A local oscillator (LO) provides a signal to a quadrature signal generator 20. Quadrature signal generator 20 provides the LO signal to mixer 16 and a quadrature version of the LO signal to mixer 18. In this manner, the RF signals may be directly "down-converted" or brought down to the lower frequency baseband signal range without first down converting to an intermediate frequency (IF).

Figure 2A:
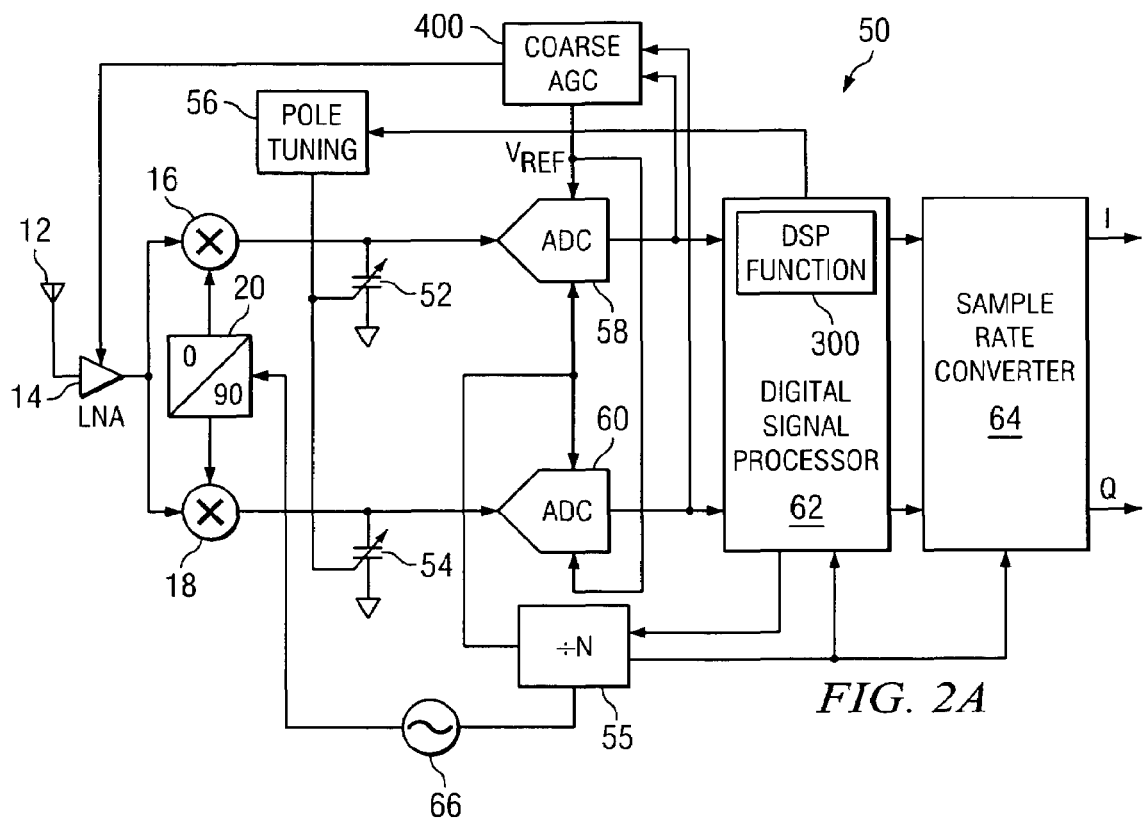
FIG. 2A depicts a receiver constructed in accordance with at least some embodiments of the invention.

FIG. 2A illustrates a receiver 50 with an architecture capable of implementing multiple communications standards. In addition to the front-end components shown in receiver 10 of FIG. 1 (i.e., LNA 14, mixers 16 and 18, and quadrature signal generator 20), receiver 50 of FIG. 2A includes capacitors 52 and 54. Capacitor 52 is coupled to the in-phase path at the output of mixer 16 and capacitor 54 is coupled to the quadrature path at the output of mixer 18. Although not specifically shown in FIG. 2A, mixers 16 and 18 both may comprise an amplifier circuit architecture that has a known, predetermined output impedance higher than that of other architectures (e.g., a common gate circuit architecture as opposed to a common drain circuit architecture). Accordingly, capacitors 52 and 54 may utilize the output impedance of mixers 16 and 18 to form low-pass filters at the outputs of mixers 16 and 18. Capacitors 52 and 54 may be variable capacitors as indicated by the arrows in FIG. 2A.

Figure 2B:
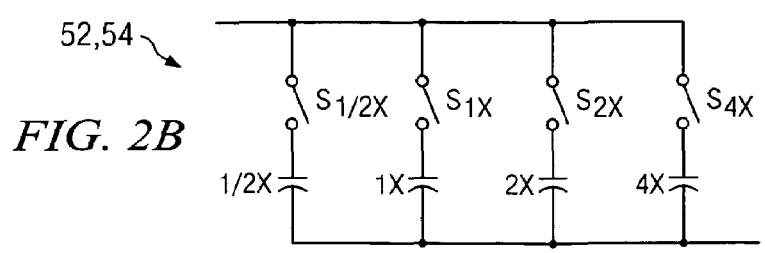
FIG. 2B depicts a variable capacitor constructed in accordance with at least some embodiments of the invention.

In one embodiment, capacitors 52 and 54 may be implemented as binary weighted capacitances as illustrated in FIG. 2B. As indicated in FIG. 2B, the binary weighted capacitance may be a combination of unit sized capacitors (size X) that are connected serially or in parallel to form the various binary values such as ½X, 1X, 2X, and 4X. The ½X value may be formed by connecting two 1X devices serially and the 2X value may be formed by connecting two 1X devices in parallel. Since each device in the binary weighted capacitance comprises combinations of unit-sized devices, layout techniques may be implemented that improve the matching of the binary values and yield a relatively precise adjustment method. Such precision matching between capacitor 52 in the in-phase path and capacitor 54 in the quadrature path aids in keeping the two paths matched.

The overall value of capacitors 52 and 54 may be adjusted by activating and de-activating switches $S_{1/2X}$, $S_{1X}$, $S_{2X}$, and $S_{4X}$. For example, if the unit sized capacitance X is equal to 10 pF, and a 15 pF capacitance is desired for capacitors 52 and 54, then activating switches $S_{1/2X}$ and $S_{1X}$, while de-activating switches $S_{2X}$, and $S_{4X}$, will yield the desired capacitance value for capacitors 52 and 54.

Referring again to FIG. 2A, coupling capacitors 52 and 54 attenuate unwanted frequencies by forming low-pass filters with relatively low-frequency poles at the outputs of mixers 16 and 18. For example, when implementing a GSM communications standard the capacitors of the low-pass filters may be tuned to a pole frequency of 300 kHz, but when implementing a CMDA2K standard the same capacitors may be tuned to a pole frequency of 900 kHz. Pole tuning circuitry 56 is coupled to capacitors 52 and 54, and adjusts the values of capacitors 52 and 54 (and consequently the frequency of the poles) for the various wireless communication standards supported by receiver 50. Pole tuning circuitry 56 is also coupled to and controlled by digital signal processor (DSP) 62. Pole tuning circuitry 56 may comprise a digital register that controls switches $S_{1/2X}$, $S_{1X}$, $S_{2X}$, and $S_{4X}$ (see FIG. 2B).

The outputs of mixers 16 and 18 couple to the inputs of analog-to-digital converters (ADCs) 58 and 60 respectively. ADCs 58 and 60 convert the mixed analog signal from mixers 16 and 18 into a digital signal for further processing by DSP 62. In the preferred embodiment of the invention the ADCs 58 and 60 may be implemented as sigma-delta, continuous time ADCs. Sigma-delta, continuous-time ADCs utilize a continuous-time loop filter, rather than a switched-capacitor discrete-time loop filter. With such ADCs the digital output is coupled to the input of an analog integrator, and the output of the analog integrator provides a feedback analog predictor signal. This predictor signal is compared with the analog input signal, and the result of the comparison determines the state of the output of a single-bit converter.

Because this type of ADC is based on digital filtering techniques, only a small percentage of the circuitry of the ADC is analog, helping to minimize problems associated with matching the two analog paths by reducing the number of analog components. Also, this type of ADC operates at a sampling frequency significantly above the Nyquist frequency of the sampled signal (e.g., 64 times the Nyquist frequency). The high sampling frequency reduces the complexity required (and therefore the physical size) of any low-pass, anti-aliasing filter coupled to the input of the ADC.

By attenuating unwanted frequencies, the low-pass filters formed by capacitors 52 and 54 may reduce the dynamic range requirements of ADCs 58 and 60. But capacitors 52 and 54 may inadvertently introduce a drop in the magnitude of wanted frequencies. Accordingly, digital correction of this drop may be implemented in DSP 62 to account for the inadvertent reduction in signal magnitude at certain frequencies.

Figure 3:
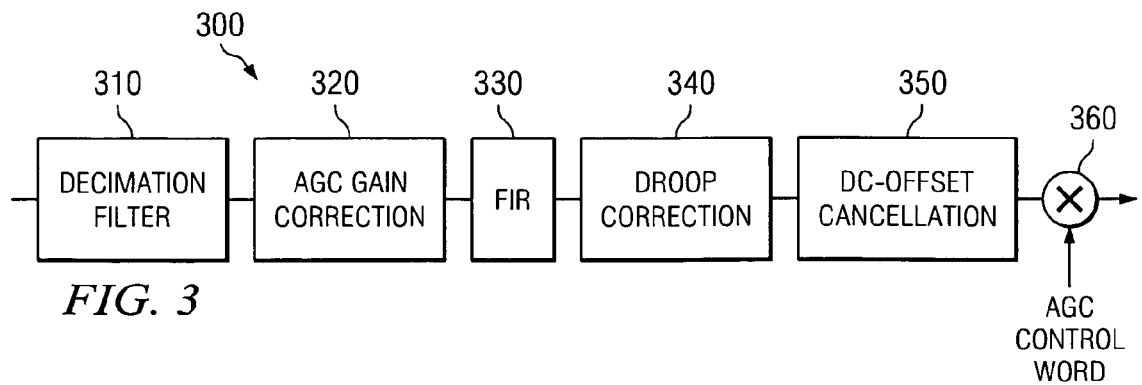
FIG. 3 depicts a digital signal processing block in accordance with at least some embodiments of the invention.

FIG. 3 depicts a block diagram of a method that may be implemented by DSP 62. This method comprises: a decimation filter block 310, an automatic gain control (AGC) gain correction block 320, a finite impulse response (FIR) filter block 330, a droop correction block 340, a DC-offset cancellation block 350, and an AGC digital multiplier block 360. The decimation filter block 310 couples to the AGC gain correction block 320. The AGC gain correction block 320 couples to the FIR filter block 330. The FIR filter block 330 couples to the droop correction block 340. The droop correction block 340 couples to the DC-offset cancellation block 350. The DC-offset cancellation block 350 couples to the fine AGC digital multiplier block 360. Each of the blocks may be implemented as a software module executing on the DSP 62.

Incoming, digital data from the ADCs 58 and 60 first passes through the decimation filter block 310 that operates to reduce the sampling frequency without aliasing. A reduced sampling frequency reduces the number of operations that must be performed by subsequent components. It is typically not necessary to operate at the over-sampling frequency of the ADCs 58 and 60 (the result of using sigma-delta, continuous-time ADCs, or other similar ADCs). The decimation filter block 310 also accomplishes a filtering of the quantization levels of the ADCs 58 and 60, which prevents aliasing the high-frequency components of the quantization noise into the baseband. The decimation filter block 310 may be implemented, for example, as a cascaded integrated comb (CIC) filter. For more details on implementing CIC filters, see E. B. Hogenauer, *An Economical Class of Digital Filters for Decimation and Interpolation*, IEEE Transactions on Acoustics, Speech and Signal Processing, 1981 at ASSP-29(2):155-162.

The digital data from the decimation filter block 310 passes to the AGC gain correction block 320, where gain adjustments that may be made by the coarse AGC 400 are corrected. The coarse AGC 400 (explained in more detail below) may shift the gain of the LNA 14 and the gain of the amplifiers within the ADCs 58 and 60 by predetermined discrete gain factors. The AGC gain correction block 320 may introduce corrections to compensate for the AGC steps introduced in earlier stages of the receiver 50. Thus, for example, if the LNA 14 was adjusted to attenuate the incoming signal by 20 dB, the AGC gain correction block 320 may digitally introduce a gain factor of 20 dB to compensate for the attenuation.

Continuing to refer to FIG. 3, data output by the AGC gain correction block 320 is input to the FIR filter block 330. The FIR filter block 330 is a low-pass filter adapted to block out-of-band signals still present in the digital data. After passing through the FIR filter block 330, the digital data passes through the droop correction block 340. The droop correction block 340 may compensate for frequency-dependent attenuation in the baseband signal. The attenuation may be introduced by the single-pole filters formed by the output structures of the mixers 18 and 20 and the variable capacitors 52 and 54. Thus, for example, if the variable capacitor is set to a pole frequency 300 kHz, the droop correction block 340 may adjust the digital data by adjusting the spectrum of the digital data stream such that there is +3 dB gain in the incoming data at 300 kHz. This results in a more-or-less constant frequency response within the desired range of frequencies corresponding to a particular communications standard (e.g., GSM, CDMA2K, WCDMA).

The data from the output of the droop correction block 340 passes to the input of the DC-offset cancellation block 350. The offset cancellation block 350 adjusts for any DC offsets superimposed onto the received signal by the analog circuitry prior to being digitized by ADCs 58 and 60. For example, mixers 16 and 18 may inadvertently introduce a DC offset onto the in-phase and quadrature signals respectively. ADCS 58 and 60, which subsequently convert the in-phase and quadrature signals, may also convert the DC offsets introduced by mixers 16 and 18. Accordingly the DC offset cancellation block 350 may remove the DC offset introduced by mixers 16 and 18 by numerically adding the negative of the value of the DC offset to the sampled digital data.

The resulting digital data stream output by the offset cancellation block 350 is forwarded to the fine AGC digital multiplier block 360. The output from the fine AGC digital multiplier block 360 provides an output data stream from the DSP 62 and to the sample rate converter 64 (FIG. 2A). The fine AGC digital multiplier block 360 scales the amplitude of the digital data up or down to a desired, optimum magnitude within the bit-width limit of the sample rate converter 64 of FIG. 2A. The sample rate converter 64 also couples to the output of the to the divide by N frequency divider ("÷N") 55. The sample rate converter 64 adjusts the data rate of the processed data stream output by the DSP 62 to match the data rate of a communications system (not shown) comprising receiver 50. This allows the processed I and Q baseband data streams from the sample rate converter to be forwarded and processed at the internal digital clock rate of said communications system.

Referring again to FIG. 2A, the receiver 50 may include the coarse AGC 400, which may introduce gain control at any of several stages of the processing of the received signal, both analog and digital. The coarse AGC 400 may step the gain up or down at various stages within the receiver 50 by predetermined, discrete gain factors. For example, the gain may be stepped in the LNA 14 at the front-end of the receiver, as well as within the ADCs 58 and 60. FIG. 3 illustrates how the coarse AGC 400 may also introduce AGC gain correction within the digital domain to correct for coarse AGC adjustments made in prior analog stages.

Figure 4:
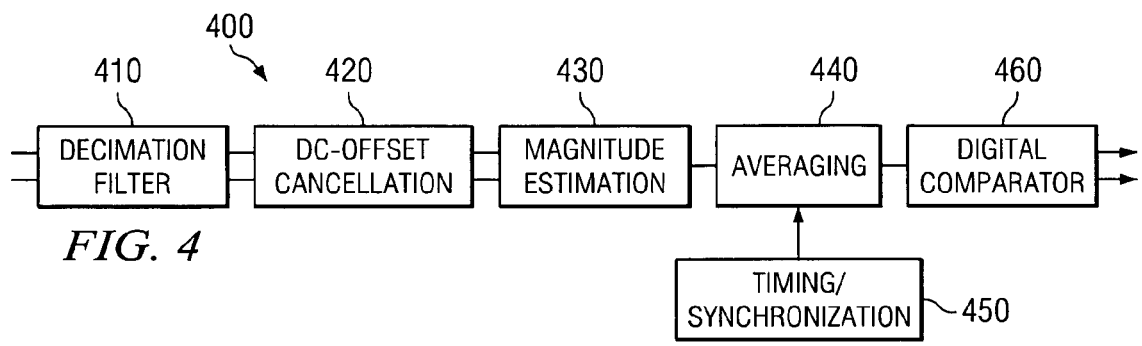
FIG. 4 depicts an automatic gain control block in accordance with at least some embodiments of the invention.

FIG. 4 illustrates how the coarse AGC 400 may be implemented. The AGC 400 comprises: a decimation filter block 410, a DC-offset cancellation block 420, a magnitude estimation block 430, an averaging block 440, a timing/synchronization block 450, and a digital comparator block 460. The decimation filter block 410 couples to the DC-offset cancellation block 420. The DC-offset cancellation block 420 couples to the magnitude estimation block 430. The magnitude estimation block 430 couples to the averaging block 440. The averaging block 440 couples to both the timing/synchronization block 450 and the digital comparator block 460. Each of these blocks may be implemented as a software module executing on the DSP 62, or as digital hardware.

The digital data from the ADCs 58 and 60 is first processed by the decimation filter block 410 (e.g., a CIC filter). The decimation filter block 410 performs the same quantization noise filtering and sampling frequency reduction as the decimation filter block 310 described above. The output of the decimation filter block 410 is subsequently processed by the DC-offset cancellation block 420. The DC-offset cancellation block 420 removes DC offsets that may be introduced by the analog circuitry of earlier stages of the receiver 50, as described above.

The resulting digital data stream output by the DC-offset cancellation block 420 is processed by the magnitude estimation block 430. Estimates of the overall magnitude of the received signal performed by the magnitude estimation block 430 may be implemented using a variety of mathematical techniques. Equation 1 depicts an illustrative technique:

$$\alpha * \max(|I|, |Q|) + \beta * \min(|I|, |Q|) \qquad (1)$$

In equation 1, |I| is the Instantaneous magnitude of the in-phase demodulated baseband signal, |Q| is the Instantaneous magnitude of the quadrature demodulated baseband signal, max and min are functions that select the maximum and minimum respectively of the two supplied arguments, and $\alpha$ and $\beta$ are weighting factors (e.g., $\alpha=1.0$ and $\beta=0.5$).

The estimated magnitude of the data stream resulting from the magnitude estimation block 430 passes to the averaging block 440. The timing/synchronization block 450 also provides input to the averaging block 440 in the form of time references. The averaging block 440 combines the results of the magnitude estimation block 430 and time references provided by the timing/synchronization block 450 to calculate a time-averaged value of the estimated magnitude and to integrate the estimated magnitude over time. This prevents the AGC from reacting to sudden changes in magnitude of short duration that may be present in the received signal (e.g., noise spikes). The resulting output from the averaging block 440 is a filtered, DC-corrected, averaged magnitude estimation that provides a basis for control of the overall gain of the receiver 50 by the digital comparator block 460. The digital comparator block 460 receives the output from the averaging block 440 and compares it to a series of threshold values to determine if action is required based on the estimated magnitude value, rate of change of the magnitude value, and the direction of change of the magnitude value. The digital comparator then may assert a series of gain control signals that couple to various amplification stages within the receiver 50 (e.g., LNA 14 and ADCs 58 and 60) to adjust the gain as appropriate given the estimated magnitude of the received signal. Although not shown in FIG. 2A, the amplification gain of the mixers 16 and 18 of the receiver 50 may also be controlled as part of an AGC strategy in some of the preferred embodiments of the receiver 50.

The coarse AGC 400 described above may be based on a strategy that implements several different control mechanisms individually or in concert. In one embodiment the digital comparator block 460 may detect an increasing signal magnitude. Upon reaching a predetermined threshold, the digital comparator block 460 (which couples to the ADCs 58 and 60 as part of the coarse AGC 400) may cause the reference voltage ($V_{ref}$) used by the ADCs 58 and 60 to vary (e.g., digital comparator may increase $V_{ref}$). This variation may be such that the minimum and maximum signal magnitudes that can be converted by ADCs 58 and 60 both shift by a predetermined, discrete amount (e.g., 30 dB), effectively attenuating the digital output of the ADCs 58 and 60 by that same amount. A similar downward shift in $V_{ref}$ may be triggered by a significant decrease in the average, estimated magnitude of the received signal.

Figure 5A:
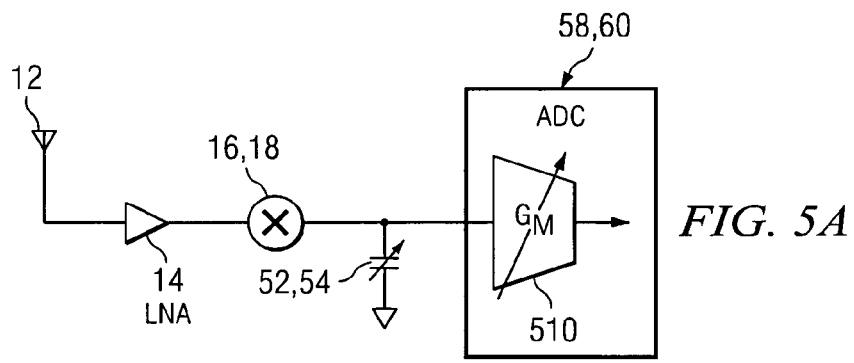
FIG. 5A depicts a mixer coupled to a transconductance amplifier and to a variable capacitor, constructed in accordance with at least some embodiments of the invention
Figure 5B:
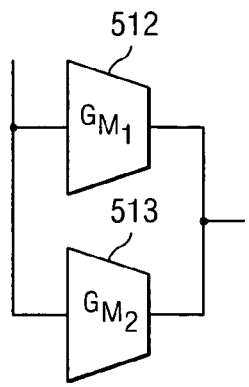
FIG. 5B depicts an illustrative configuration of a transconductance amplifier constructed in accordance with at least some embodiments of the invention

In another embodiment, the input amplifiers 510 of the ADCs 58 and 60 may be each implemented as transconductance amplifier pairs 512 and 513, with the outputs within each pair connected at a summing node, as shown in FIG. 5B. In this embodiment, the amplitude of the signal may be controlled at the input of the ADCs 58 and 60 by selectively enabling and disabling the individual transconductance amplifiers 512 and 513. For example, if each amplifier provides a gain factor of 20 dB, then enabling both of the transconductance amplifiers within a pair (e.g., transconductance amplifiers 512 and 513) would provide an overall gain of 0 dB, whereas enabling one (e.g., transconductance amplifier 512) would only provide a gain of −20 dB. Thus, if the digital comparator block 460 detects an increase in magnitude close to the maximum $V_{ref}$ (e.g., less than an order of magnitude) while two of the transconductance amplifiers are enabled, the digital comparator 460 may decrease the gain of the ADCs 58 and 60 by 20 dB by disabling one of the transconductance amplifiers. Likewise, if the digital comparator block 460 detects a decrease in magnitude significantly below the minimum $V_{ref}$ (e.g., 4 orders of magnitude or more) and only one of the transconductance amplifiers (e.g., transconductance amplifier 512) is enabled, the digital comparator block 460 may increase the gain of the ADCs 58 and 60 by 20 dB by enabling the second transconductance amplifier (e.g., transconductance amplifier 513).

In yet another embodiment, the digital comparator block 460 may control the gain range of the LNA 14 of FIG. 2A. This may be advantageous since gain reductions implemented at the input amplifiers 512 and 513 of the ADCs 58 and 60 do not account for the possibility of a strong signal that may saturate the mixers 16 and 18 of FIG. 2A. The digital comparator block 460 may be programmed to decrease the gain of the LNA 14 in response to received signal magnitude increases that are beyond those that may trigger other gain reductions in later stages of the receiver 50 (as previously described). The digital comparator block 460 may be programmed to decrease the gain of the LNA 14 by decreasing the gain control voltage of the LNA 14 by a predetermined, discrete value when a predetermined maximum signal magnitude threshold is exceeded. The process may be reversed for a signal of decreasing magnitude, whereby the gain of the LNA 14 may be increased when the signal magnitude drops below a predetermined threshold value.

The various AGC implementations of the illustrative embodiments described above may be combined so as to optimize the signal-to-noise ratio (SNR) of the receiver 50. The digital comparator block 460 may be programmed so as to increase the gain of stages electrically closer to the front-end of the receiver 50 first, progressively increasing the gain of additional stages in order of decreased electrical proximity to the front-end of the receiver 50. Thus, in the embodiment of the receiver 50 illustrated in FIG. 2A, a received signal of decreasing magnitude may result in an increase in the gain of the LNA 14 first, followed by a downward shift in the $V_{ref}$ window of the ADCs 58 and 60, followed by an increase in the gain of the input amplifiers to the ADCs 58 and 60. This strategy results in an optimum SNR by only increasing the gain of those stages more prone to noise injection when needed for maximum amplification of an extremely weak signal.

Referring to the embodiment illustrated in FIG. 5A, the variable gain transconductance amplifier 510 is adapted to convert from the voltage mode of operation at the output of, for example, the mixer 16 to the current mode of operation at the output of the variable gain transconductance amplifier 510. Operating the variable gain transconductance amplifier 510 in a current mode results in a high degree of isolation between the input and output of the ADC 58. This is accomplished even when receiving a high magnitude signal, due to the low amplitude voltage swing of the signal at the input to the converter of the ADC 58 and the correspondingly lower signal bleed-through in the semiconductor substrate. Bleed-through occurs when a large amplitude signal that is applied to one part of a semiconductor device couples through the semiconductor substrate to another part of the same device where a very weak signal is present. This may generate several undesirable effects, such as, for example, distortion, crosstalk, and false AGC activation within the receiver. These principles as described also apply to the path comprising mixer 18 and ADC 60, also shown in FIG. 5A.

Figure 6:
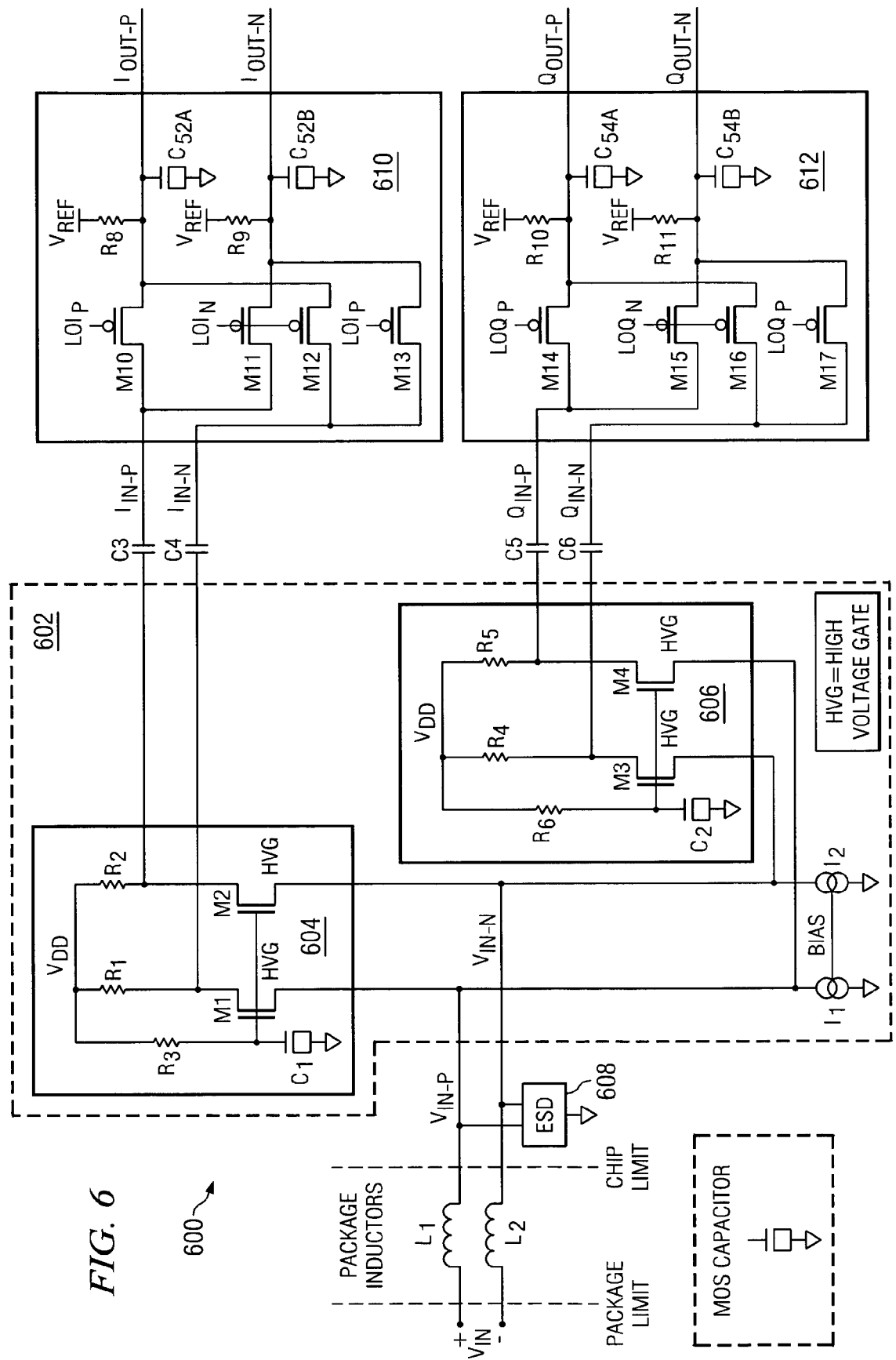
FIG. 6 depicts an illustrative mixer circuit constructed in accordance with at least some embodiments of the invention.

FIG. 6 depicts an illustrative mixer system 600 (corresponding to the mixers 16 and 18) implemented using complimentary metal oxide semiconductor (CMOS) technology. This technology provides several types of devices within a single semiconductor substrate, including both high and low voltage MOS devices. The high voltage gate (HVG) devices may be constructed using an oxide layer between the gate node and the underlying semiconductor substrate that is thicker than that used for the core, low voltage devices. These HVG devices are already available within a given CMOS process and require no additional processing steps in the manufacture of the semiconductor device. Because these devices operate at a higher gate-to-source threshold voltage, they may be used in applications involving larger amplitude signals than is possible with the core, low voltage devices.

The output of an external LNA (not shown) couples to the package inductors $L_1$ and $L_2$ at each differential leg of the $V_{IN}$ input of the mixer system 600. The inductors $L_1$ and $L_2$ in turn couple to electrostatic discharge (ESD) protection 608, as well as HVG devices $M_1$-$M_4$ and current sources $I_1$ and $I_2$. The input buffer 602 of the mixer system 600, comprising HVG devices $M_1$-$M_4$, constant current sources $I_1$ and $I_2$, resistors $R_1$-$R_6$, and capacitors $C_1$ and $C_2$, is divided into two amplifiers. Amplifier 604 comprises devices $M_1$ and $M_2$, resistors $R_1$-$R_3$, and capacitor $C_1$. The output of amplifier 604 couples to differential inputs $I_{IN-P}$ and $I_{IN-N}$ of the in-phase mixer (I-mixer) 610 via coupling capacitors C3 and C4. Amplifier 606 comprises devices $M_3$ and $M_4$, resistors $R_4$-$R_6$, and capacitor $C_2$. The output of amplifier 606 couples to differential inputs $Q_{IN-P}$ and $Q_{IN-N}$ of the quadrature mixer (Q-mixer) 612 via coupling capacitors C5 and C6. Both amplifiers 604 and 606 share the two current sources $I_1$ and $I_2$, and both provide isolation between the $V_{IN}$ input of the mixer system 600 and the inputs $I_{IN-P}$, $I_{IN-N}$, $Q_{IN-P}$ and $Q_{IN-N}$ of the I-mixer 610 and the Q-mixer 612 respectively.

Each half of the amplifiers 604 and 608 is configured as a common gate amplifier. For example, the differential amplifier leg comprising HVG device $M_1$ couples to $V_{DD}$ at its drain by way of resistor $R_1$, and to $V_{DD}$ at its gate by way of resistor $R_3$. The source of HVG device $M_1$ couples to current source $I_1$ and to the positive differential input via inductor $L_1$. The drain of device $M_1$ is the output node of the $M_1$ half of the amplifier 604 ($I_{IN-N}$). In this configuration, the $M_1$ amplifier operates in a current mode, providing a small, overall voltage swing at its output node, while providing a high output impedance.

$I_{IN\text{-}N}$ couples to two P-type metal oxide semiconductor (PMOS) devices, $M_{12}$ and $M_{13}$ of the I-mixer 610, which act as transfer gates to each of the differential outputs of the I-mixer 610. The source nodes of PMOS devices $M_{12}$ and $M_{13}$ couple to each other and to $I_{IN\text{-}N}$. The drain node of PMOS device $M_{12}$ couples to the in-phase positive output ($I_{OUT\text{-}P}$) of the output of the I-mixer 610, and the drain node of PMOS device $M_{13}$ couples to the in-phase negative output ($I_{OUT\text{-}N}$) of the I-mixer 610. Likewise, the source nodes of PMOS devices $M_{10}$ and $M_{11}$ both couple to the output of the $M_2$ half of the amplifier 604 ($I_{IN\text{-}P}$), and the drain nodes respectively couple to the $I_{OUT\text{-}P}$ and $I_{OUT\text{-}N}$ outputs of the I-mixer 610. Outputs $I_{OUT\text{-}P}$ and $I_{OUT\text{-}N}$ each couple to a bias resistor ($R_8$ and $R_9$ respectively, each coupled to $V_{REF}$), and to a metal oxide semiconductor (MOS) capacitor ($C_{52A}$ and $C_{52B}$ respectively, each coupled to ground).

PMOS devices $M_{12}$ and $M_{13}$ each have their gates coupled to opposite phases of the in-phase local oscillator (LOI) differential output of quadrature signal generator 20 (see FIG. 2A), with the negative phase of the LOI signal ($LOI_N$) gating $I_{IN\text{-}N}$ to the $I_{OUT\text{-}P}$ output of the I-mixer 610 (via PMOS device $M_{12}$), and the positive phase of the LOI signal ($LOI_P$) gating $I_{IN\text{-}N}$ to the output leg $I_{OUT\text{-}N}$ of the I-mixer 610 (via PMOS device $M_{13}$). PMOS devices $M_{10}$ and $M_{11}$ similarly each have their gates coupled to the LOI differential output of quadrature signal generator 20, but with the $LOI_P$ signal gating $I_{IN\text{-}P}$ to the $I_{OUT\text{-}P}$ output of the I-mixer 610 (via PMOS device $M_{10}$), and the $LOI_N$ signal gating $I_{IN\text{-}P}$ to the $I_{OUT\text{-}N}$ output of the I-mixer 610 (via PMOS device $M_{11}$).

In one embodiment of the mixer system 600 of FIG. 6 the local oscillator 66 driving the quadrature signal generator 20 (see FIG. 2A) may be implemented as a phase-locked loop (PLL) oscillator, enabling the local oscillator to track with the carrier frequency of the received signal. This type of oscillator, when combined with the quadrature signal generator 20 and the I-mixer 610, results in the mixing of the differential local oscillator signal and the differential received signal, each of the same base frequency. Thus, the resulting output from the I-mixer 610 is the "I" or in-phase portion of the original baseband signal used to modulate the received carrier at the transmitter. The local oscillator 66 also may couple to the divide by N frequency divider 55, which in turn may couple to and provide timing signals for other elements of the receiver 50, (e.g., the DSP 62, the sample rate converter 64, and the ADCs 58 and 60, as illustrated in FIG. 2A). The DSP 62 may control the oscillator 66 and the divide by N frequency divider 55 to set the operating frequency of the receiver 50.

The quadrature half of the mixer system 600, comprising the amplifier 606 and Q-mixer 612, demodulates the quadrature or "Q" or quadrature portion of the original baseband in a manner similar to the in-phase half of the mixer system 600. The quadrature local oscillator (LOQ) differential output of the quadrature signal generator 20 is coupled to the transfer gates $M_{14}$-$M_{17}$ of the Q-mixer 612 instead of the LOI differential output. The $LOQ_P$ and $LOQ_N$ signals used in the Q-mixer 612 correspond to $LOI_P$ and $LOI_N$ signal used in the in-phase half of the I-mixer 610. The output of the Q-mixer 612 is the "Q" or quadrature portion of the original baseband signal used to modulate the received carrier at the transmitter.

Figure 5C:
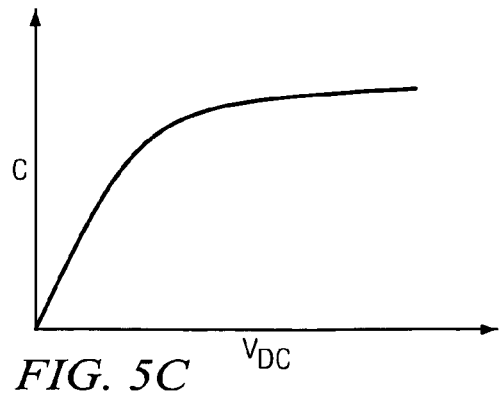
FIG. 5C depicts an illustrative capacitance-voltage curve for a metal oxide semiconductor (MOS) capacitor, in accordance with at least some embodiments of the invention.

As previously mentioned, capacitors 52 and 54 of FIG. 2A, which may be implemented as N-type metal oxide semiconductor (NMOS) capacitors within an N-well in accordance with at least some embodiments of the invention, may be used in conjunction with the output impedance of the mixers 16 and 18 to form low-pass filters. As described, the mixer system 600 of FIG. 6 has outputs with a high output impedance (when compared to circuits using other circuit architectures), and thus, for a given pole-frequency, the capacitors 52 and 54 may be smaller in value than would be necessary if the output impedance of the mixer outputs were lower. Also, the outputs of the mixer system 600 may be biased at a voltage that is within the accumulation region of the NMOS capacitors, resulting in optimal capacitance density (see the voltage-capacitance curve of FIG. 5C). When the biasing of the outputs within the accumulation region of the NMOS capacitors is combined with the low voltage swing of the output signals from the mixer system 600, distortion of the output signals due to the use of the NMOS capacitor may be minimized.

Figure 7:
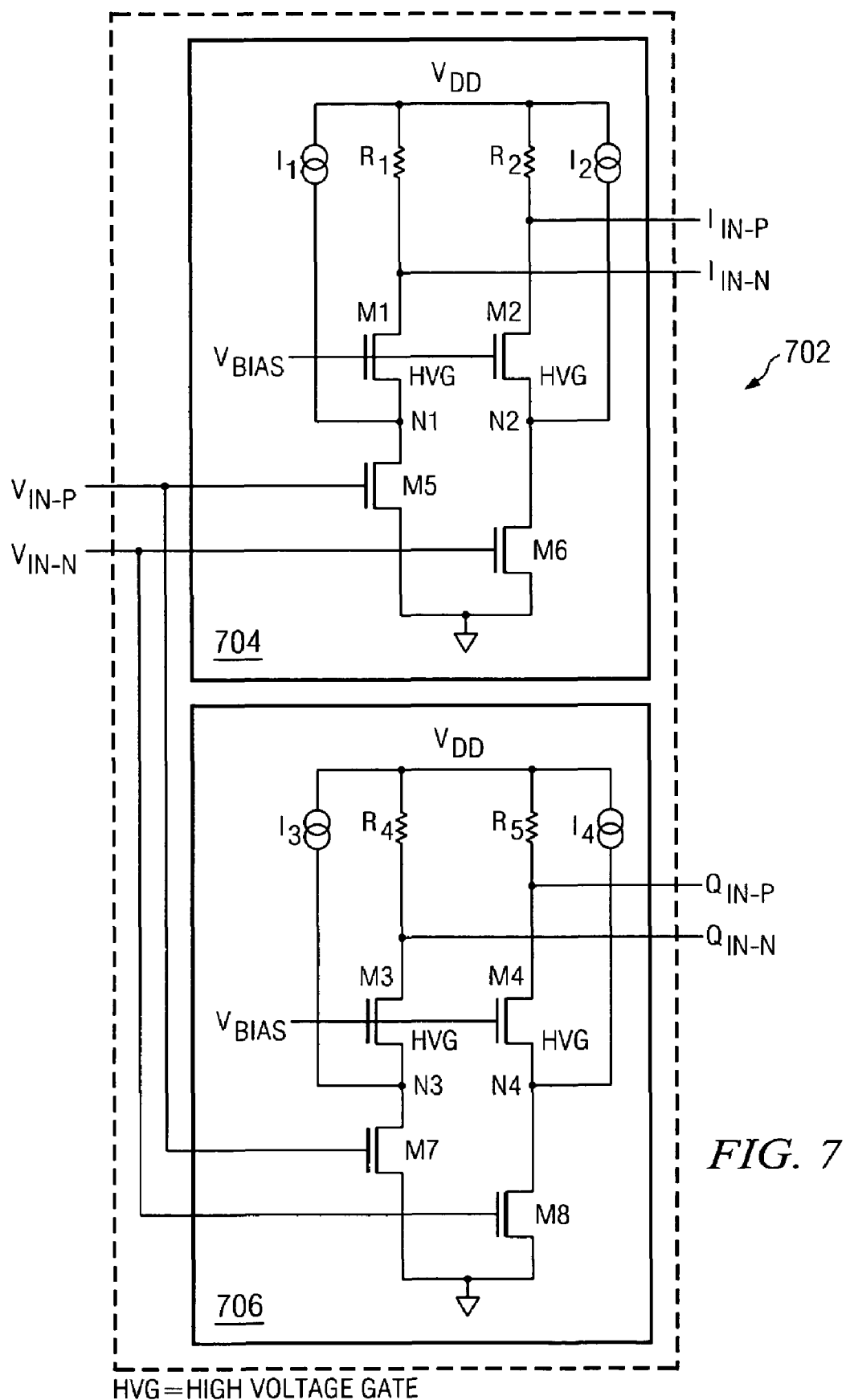
FIG. 7 depicts another illustrative mixer circuit constructed in accordance with at least some embodiments of the invention.

The mixer system 600 of FIG. 6 may be modified to incorporate an input buffer adapted to couple to an internal (on-chip) LNA operating at a lower voltage than an off-chip LNA. FIG. 7 depicts such an illustrative input buffer 702, which may be constructed using the same semiconductor substrate and process as the LNA 14 of FIG. 2A and the I- and Q-mixers 610 and 612 of FIG. 6. Referring to the amplifier 704 of FIG. 7, the differential outputs from the on-chip LNA 14 ($V_{IN\text{-}P}$ and $V_{IN\text{-}N}$) couple to the gates of devices $M_5$ and $M_6$. The source nodes of devices $M_5$ and $M_6$ each couple to ground, and the drain nodes of devices $M_5$ and $M_6$ each couple to the source nodes of HVG devices $M_1$ and $M_2$ respectively. HVG device $M_1$ couples to $V_{DD}$ by way of resistor $R_1$, and both $M_1$ and $R_1$ couple to output $I_{IN\text{-}N}$ (via coupling capacitor C4 of FIG. 6). HVG device $M_2$ couples to $V_{DD}$ by way of resistor $R_2$, and both $M_2$ and $R_2$ couple to output $I_{IN\text{-}P}$ (via coupling capacitor C3 of FIG. 6). The gates of HVG devices $M_1$ and $M_2$ couple to each other and to a biasing source ($V_{BIAS}$). Node $N_1$ between HVG device $M_1$ and device $M_5$ couples to constant current source $I_1$ which also couples to $V_{DD}$. Likewise, node $N_2$ between HVG device $M_2$ and device $M_6$ couples to constant current source $I_2$, which also couples to $V_{DD}$. The amplifier 706, providing output signals $Q_{IN\text{-}N}$ and $Q_{IN\text{-}P}$ (via coupling capacitors C6 and C5 respectively of FIG. 6), may be similarly constructed and is also illustrated in FIG. 7.

The amplifiers 704 and 706 of the modified input buffer 702 illustrated in FIG. 7 are adapted to accept low voltage signals from an on-chip LNA. The output from such an LNA (e.g., LNA 14) may drive the gate of devices $M_5$ and $M_6$ of amplifier 704, which are implemented using the core CMOS process of the semiconductor chip. The core CMOS process is the process used to implement the majority of the devices within an integrated circuit, and, in the illustrative embodiments described, operates within a lower voltage range than the HVG devices used within the mixer system 600. To isolate devices $M_5$ and $M_6$ from the higher $V_{DD}$ voltage, HVG devices $M_1$ and $M_2$ are placed between the output nodes and devices $M_5$ and $M_6$. The gates of HVG devices $M_1$ and $M_2$ are biased so as to keep the devices $M_5$ and $M_6$ from saturating. Additionally, the constant current sources $I_1$ and $I_2$ in FIG. 7 provide current injection at nodes $N_1$ and $N_2$ respectively. This allows the load resistors $R_1$ and $R_2$ to be set to larger values, which increases the overall gain of the amplifier 704 (and similarly for the amplifier 706 with regard to resistors $R_3$ and $R_4$), while still operating device $M_5$ (and similarly $M_6$) within its linear region.

The $I_{IN\text{-}P}$ and $I_{IN\text{-}P}$ outputs of amplifier 704 of FIG. 7 couple to the I-mixer of FIG. 6 in the same manner as the $I_{IN-P}$ and $I_{IN-P}$ outputs of amplifier 604 of FIG. 6 as described above. Likewise, $Q_{IN-P}$ and $Q_{IN-N}$ outputs of amplifier 706 of FIG. 7 couple to the Q-mixer of FIG. 6 in the same manner as the $Q_{IN-P}$ and $Q_{IN-N}$ outputs of amplifier 606 of FIG. 6. Beyond providing low-voltage inputs, a mixer system 600 adapted to incorporate an illustrative input buffer 702 as illustrated in FIG. 7 has similar characteristics and advantages as a mixer system 600 incorporating an illustrative input buffer 602 implemented as illustrated in FIG. 6.

Both input buffers 602 and 702 incorporate HVG MOS devices. As previously noted, these devices allow operation at a higher voltage than is possible using only core, low-voltage devices. A circuit comprising the HVG devices may accept signals of greater voltage before reaching saturation (more voltage headroom) than a circuit that only comprises low voltage, core devices, and thus, problems related to early signal compression within a mixer circuit may be mitigated. For example, if the core devices operate at 1.3 volts, but the HVG devices operate at 1.8 volts, a circuit incorporating HVG devices and operating at 1.8 volts may handle signals more than 38% greater in voltage magnitude than a similar 1.3 volt circuit.

While the various embodiments of the present invention have been shown and described, modifications thereof can be made by one skilled in the art without departing from the spirit and teachings of the invention. The embodiments described herein are illustrative only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. A communications system, comprising:
   a processor;
   a radio frequency (RF) quadrature demodulator;
   an analog-to-digital converter (ADC) coupling an output of the demodulator to an input of the processor;
   a variable capacitor, directly coupled to the demodulator output and to the analog-to-digital converter (ADC); and
   wherein the processor, the RF quadrature demodulator, and the variable capacitor are integrated on a single, semiconductor chip.

2. The communications system of claim 1, wherein the variable capacitor and output circuitry of the demodulator form a tunable, low-pass single-pole filter.

3. The communications system of claim 1, wherein an input amplifier of the RF quadrature demodulator comprises a common-gate amplifier.

4. The communications system of claim 1, wherein the variable capacitor comprises a plurality of fixed capacitors coupled together through one or more switches, the one or more switches coupled to and controlled by the processor.

5. The communications system of claim 4, wherein the plurality of fixed capacitors can be selectively combined together in parallel by operating each of the one or more switches.

6. The communications system of claim 4, wherein the plurality of fixed capacitors can be selectively combined together in series by operating each of the one or more switches.

7. The communications system of claim 4, wherein the plurality of fixed capacitors can be selectively combined together in parallel and in series by operating each of the one or more switches.

8. The communications system of claim 4, wherein the fixed capacitors are metal oxide semiconductor (MOS) capacitors, biased to operate in an accumulation region of the MOS capacitor.

9. The communications system of claim 1, wherein the variable capacitor and output circuitry of the RF quadrature demodulator form a tunable, low-pass filter.

10. The communications system of claim 1, wherein the processor sets the pole frequency of the tunable, low-pass filter.

11. The communications system of claim 1, further comprising a variable oscillator coupled to the processor.

12. The communications system of claim 11, further comprising a continuous-time, sigma-delta analog-to-digital converter (ADC), coupled between the processor and the RF quadrature demodulator.

13. The communications system of claim 12, wherein the variable oscillator, the frequency divider and the ADC are integrated on a single chip with the processor, the RF quadrature demodulator, and the variable capacitor.

14. The communications system of claim 12, wherein the ADC input circuitry comprises a plurality of transconductance amplifiers coupled in parallel with one another.

15. The communications system of claim 14, wherein control of the communications system gain comprises adjusting the gain of the ADC by selectively enabling one or more of the plurality of transconductance amplifiers.

16. The communications system of claim 15, further comprising a variable gain amplifier (VGA), wherein control of the communications system gain further comprises adjusting the VGA gain in discrete steps.

17. The communications system of claim 16, wherein the VGA is integrated on the signal, semiconductor chip.

18. The communications system of claim 1, wherein the ADC samples an output of the RF quadrature demodulator.

19. The communications system of claim 1, wherein the processor sets a frequency of the communications system by controlling the variable oscillator, the frequency divider and the variable capacitor.

20. The communications system of claim 1, wherein output circuitry of the RF quadrature demodulator and the variable capacitor form a tunable, single-pole, low-pass filter.

21. The communications system of claim 1, further comprising an RF low-noise amplifier (LNA) coupled to the input of the RF quadrature demodulator, wherein the RF LNA is integrated on the single, semiconductor chip.

22. The communications system of claim 1, wherein the processor monitors a magnitude of a received signal and controls communications system gain in response to the magnitude of the received signal.

* * * * *